(12) United States Patent
Wiley et al.

(10) Patent No.: US 9,900,042 B2
(45) Date of Patent: *Feb. 20, 2018

(54) SUN SHADE CASE FOR A PORTABLE COMPUTING DEVICE

(71) Applicants: Nicholas Wiley, Littlestown, PA (US); Judy Wiley, Littlestown, PA (US)

(72) Inventors: Nicholas Wiley, Littlestown, PA (US); Judy Wiley, Littlestown, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/209,195

(22) Filed: Jul. 13, 2016

(65) Prior Publication Data

US 2016/0373157 A1 Dec. 22, 2016

Related U.S. Application Data

(63) Continuation of application No. 14/309,445, filed on Jun. 19, 2014, now Pat. No. 9,417,668.

(60) Provisional application No. 61/838,934, filed on Jun. 25, 2013.

(51) Int. Cl.

| G06F 1/18 | (2006.01) |
|---|---|
| H04B 1/3888 | (2015.01) |
| A45C 11/00 | (2006.01) |
| G06F 1/16 | (2006.01) |
| H04N 5/225 | (2006.01) |
| H04N 5/232 | (2006.01) |

(52) U.S. Cl.
CPC ............ *H04B 1/3888* (2013.01); *A45C 11/00* (2013.01); *G06F 1/1626* (2013.01); *G06F 1/1686* (2013.01); *G06F 1/181* (2013.01); *H04N 5/2257* (2013.01); *H04N 5/23293* (2013.01); *A45C 2011/003* (2013.01); *A45C 2200/15* (2013.01); *G06F 1/1628* (2013.01)

(58) Field of Classification Search
CPC .................. G06F 1/181; A45C 2200/15; A45C 2011/003
USPC ...... 206/320, 751, 754, 753, 45.23, 45.2, 38
See application file for complete search history.

(56) References Cited

U.S. PATENT DOCUMENTS

| 4,612,583 | A |   | 9/1986  | Ayervais |
|---|---|---|---|---|
| 5,233,468 | A | * | 8/1993  | McNulty ............... G06F 1/1603 348/842 |
| 5,762,250 | A |   | 6/1998  | Carlton et al. |
| 5,988,823 | A |   | 11/1999 | Wong |
| 6,046,754 | A | * | 4/2000  | Stanek .................. G06F 1/1603 345/169 |
| 6,084,711 | A |   | 7/2000  | Duff |
| 6,144,419 | A |   | 11/2000 | Schmidt |
| 6,394,615 | B1 |  | 5/2002  | Hill et al. |
| 6,772,883 | B2 |  | 8/2004  | Lindamood |
| D514,582  | S |   | 2/2006  | Dulberger |
| D530,719  | S |   | 10/2006 | Roubanis |
| 7,303,077 | B2 |  | 12/2007 | Harlocker |
| 7,508,657 | B1 |  | 3/2009  | Smith |
| 8,109,421 | B2 |  | 2/2012  | McLean et al. |
| 2004/0206645 | A1 | | 10/2004 | Roubanis |

(Continued)

*Primary Examiner* — King M Chu

(74) *Attorney, Agent, or Firm* — Leveque IP Law, P.C.

(57) ABSTRACT

The present portable computing device case is configurable for both carrying a portable computing device and for obstructing external lighting while using a portable computing device in an upright viewing position, particularly for augmented reality applications, outdoor gaming applications and for use of a digital camera housed within the portable computing device.

19 Claims, 15 Drawing Sheets

(56) References Cited

U.S. PATENT DOCUMENTS

| | | | |
|---|---|---|---|
| 2011/0011759 A1* | 1/2011 | Luo | A45C 5/03 |
| | | | 206/320 |
| 2013/0093788 A1 | 4/2013 | Liu | |
| 2013/0095924 A1 | 4/2013 | Geisner et al. | |
| 2013/0130813 A1 | 5/2013 | Ackley et al. | |
| 2013/0341233 A1 | 12/2013 | Dow | |

* cited by examiner

SUN SHADE CASE FOR A PORTABLE COMPUTING DEVICE

PRIORITY CLAIM

This application is a continuation of the application entitled "A Sun Shade Case for a Portable Computing Device," U.S. application Ser. No. 14/309,445 filed on Jun. 19, 2014, which claims the benefit of provisional application entitled "A Sun Shade Case for a Portable Computing Device," U.S. Provisional Application No. 61/838,934 filed on Jun. 25, 2013. These prior applications, including the entire written description and drawing figures, are hereby incorporated into the present application by reference.

FIELD

The present portable computing device case is configurable for both carrying a portable computing device and for obstructing external lighting while using a portable computing device, particularly for augmented reality applications.

BACKGROUND

As more individuals are purchasing portable computing devices, a market exists for devices for carrying the portable computing devices. These carrying devices are typically designed to be highly portable and facilitate the user's ability to carry the device easily while also providing some degree of protection from various environmental factors. Common examples of these devices are the Apple iPad and the Samsung Galaxy Note 10.1, both of which are tablet computing devices with touchscreen interfaces and large color displays.

A growing variety of uses for these portable computing devices, particularly tablet computers, are being found. Rich interactive content is becoming increasingly popular as a more entities are creating applications for use on portable computing devices. Increasingly, applications are being created for portable computing devices that are to be used in circumstances where external lighting may interfere with the usage of the application. Such applications include augmented reality applications where the portable computing device provides informative overlays over the user's current field of view. The screens of the portable computing devices, including the Apple iPad and the Samsung Galaxy Note 10.1, typically suffer glare and other issues when used outside. The user of such portable computing devices may also not perceive the rich interactive contents displayed on the screen as easily when used outside.

It would be desirable to have a device for both carrying the portable computing device and for also controlling the external lighting so that the user may use the application without glare and other lighting effects interfering with the user's use of the application.

Portable computing devices are being used in a variety of contexts, including public areas. Increasingly, users may desire privacy when using their portable computing device for a variety of reasons. The user may need privacy for an extended period of time. It would be desirable to have a device for carrying the portable computing device and also for comfortably providing privacy so that the user may use the portable computing device in any context.

The increasing popularity and user friendliness of portable computing devices causes these devices to be used in circumstances where ease of use and simplicity are desired. For example, an entity may wish to provide a case for portable computing devices that are loaned to individuals so that rich interactive content created by the entity may be enjoyed by the individuals. The portable computing devices would need to be easily carried by the individuals in a secure manner so that the portable computing devices may be returned to the entity after use. It would be desirable to have an affordable device for carrying the portable computing device and for also ensuring that rich interactive content may be enjoyed.

DRAWINGS

The details of one or more embodiments of the disclosure are set forth in the accompanying drawings and the description below. Other features, objects, and advantages will be apparent from the description and drawings, and from the claims.

DETAILED DESCRIPTION

None of the known prior art discloses an external light blocking enclosure, privacy protection function, and prop mechanism integrated into a case for electronic tablet computer made specifically for viewing tablet computers in an upright position in bright light in conjunction with full facility of the camera for viewing outdoor augmented reality, as described herein in accordance with various disclosed embodiments.

The present portable computing device holder is a case 1 that has four distinct configurations. The four different configurations include a carrying configuration, an enclosing configuration, a loading configuration and a standing configuration. The case 1 described by the present disclosure is able to assume these different configurations to provide distinct and useful functions for a user.

Figure 1:
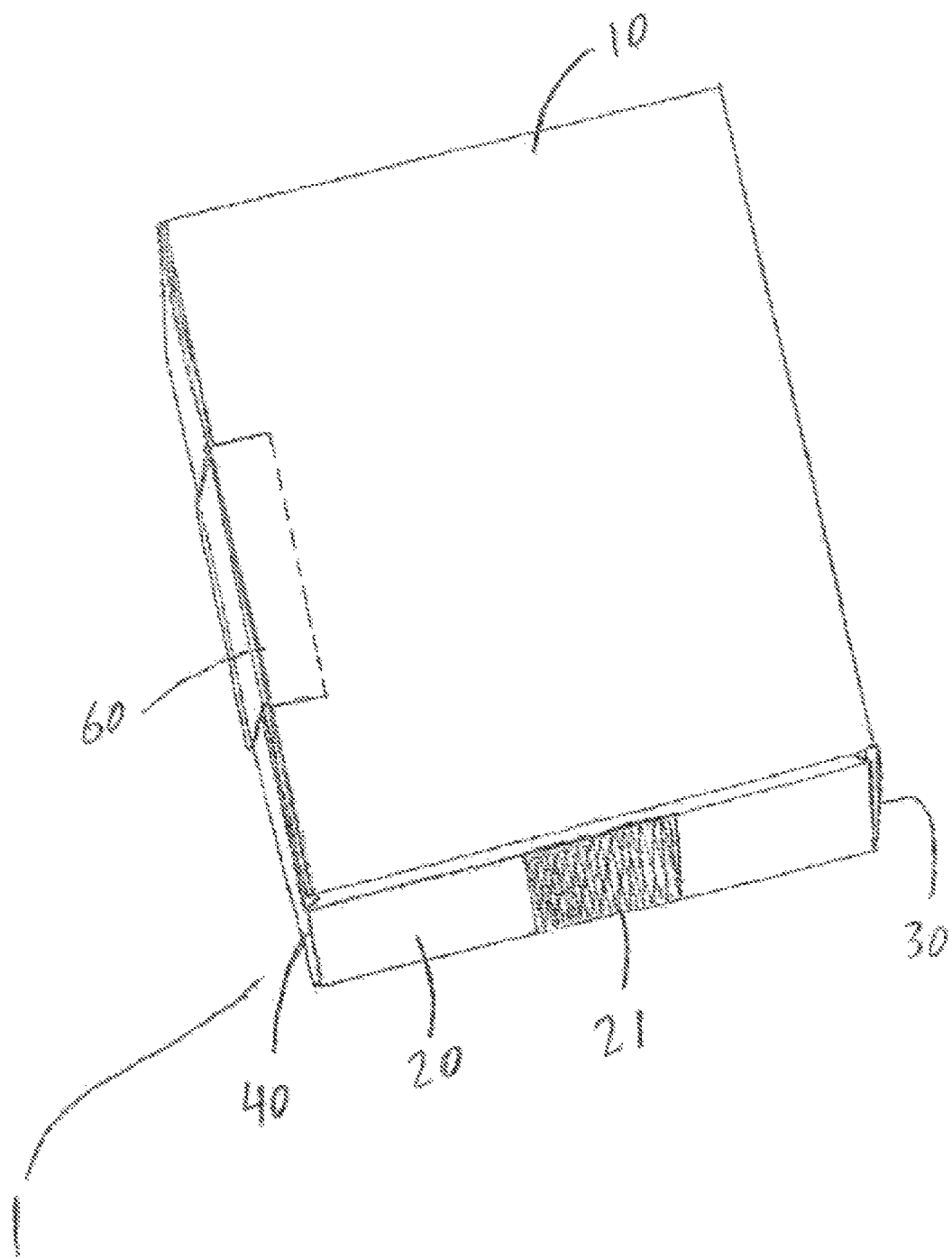
FIG. 1 illustrates an embodiment of the case in a carrying configuration.

FIG. 1 illustrates one embodiment of the present portable computing device holder. The illustrated embodiment is in the carrying configuration. The case 1 is dimensioned to secure a typical portable computing device, such as, for example, a tablet computer or an electronic book reader. The case 1, when in the carrying configuration, encloses and secures the portable computing device. The illustrated case includes a top portion 10 that includes an aperture cover 60. A back portion 30 is positioned opposite a front portion 40 when the case 1 is in the carrying configuration. The back portion 30 functions both as a hinge and as an additional securing wall for helping secure the portable computing device in the carrying configuration. The back portion 30 connects the top portion 10 and a bottom portion 50. Two side portions 20 are positioned opposite each other. The front portion 40 and two side portions 20 extend upward from the bottom portion 50. When in the carrying configuration, the top portion 10 is positioned parallel and opposite the bottom portion 50, and the back portion 30 is positioned parallel and opposite the front portion 40. In the carrying configuration, the portable computing device is fully enclosed by the case 1, other than optional ports to control switches (e.g., volume control, home keys, mute buttons, opening to expose the lens of a camera module, opening for an audio jack, opening for a power/data transfer cord, as examples). The top portion 10, the two side portions 20, the back portion 30 and the front portion 40, and the bottom portion 50 define six sides that form an enclosure for securing the portable computing device.

Figure 2:
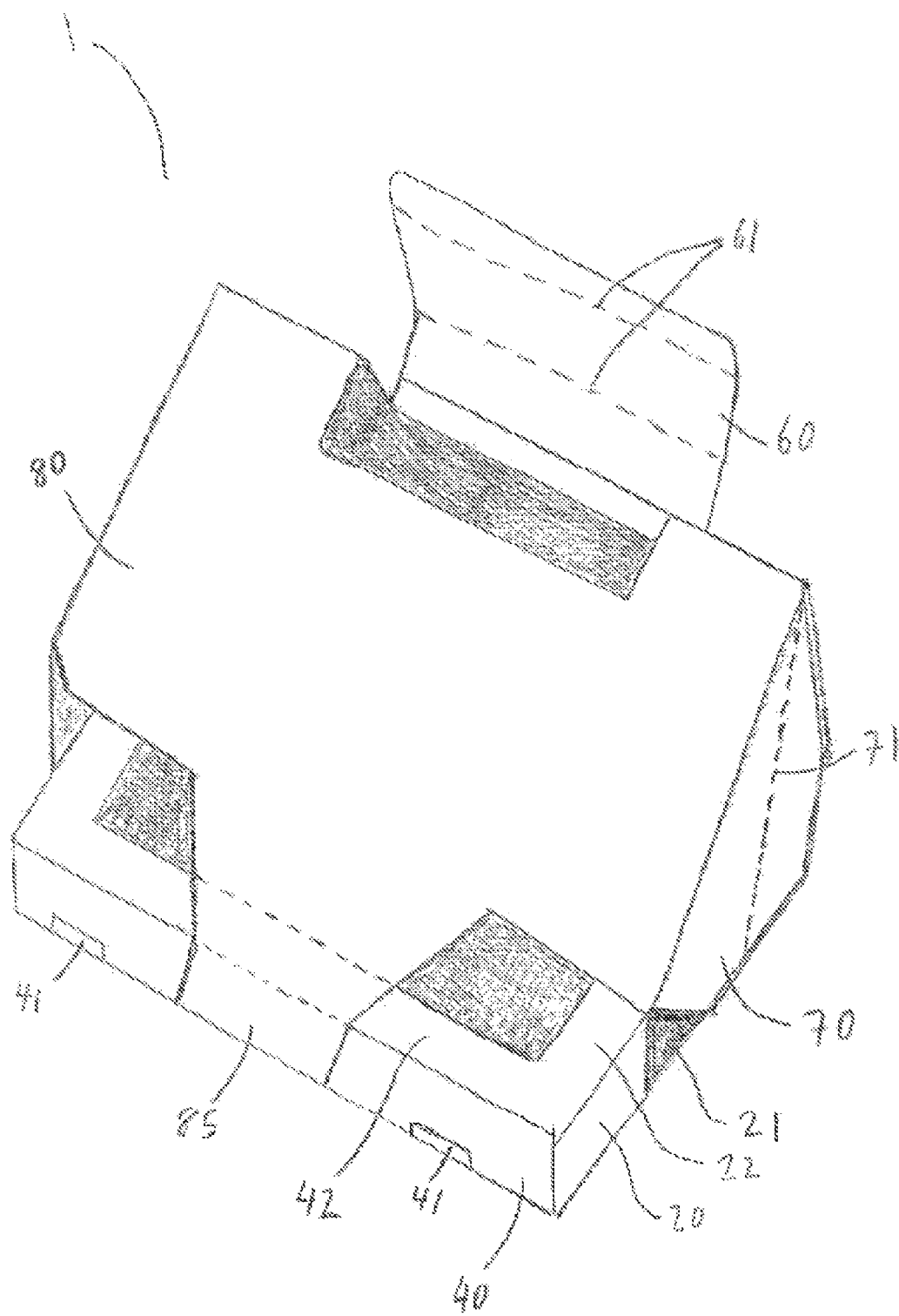
FIG. 2 illustrates the embodiment of the case shown in FIG. 1 in an enclosing configuration.

FIG. 2 illustrates an embodiment of the present portable computing device holder in the enclosing configuration. In the enclosing configuration, a front wall 80 that is connected to the top portion 10 is extended along with two side walls 70. The two side walls 70 are extended when they define two parallel planes on opposite sides of the bottom portion 50. FIG. 2 shows one embodiment of the case 1 where the side walls 70 include side wall folds 71. Though only one fold line is shown, embodiments that have multiple folds to create an accordion or pleated side are envisioned.

Figure 6:
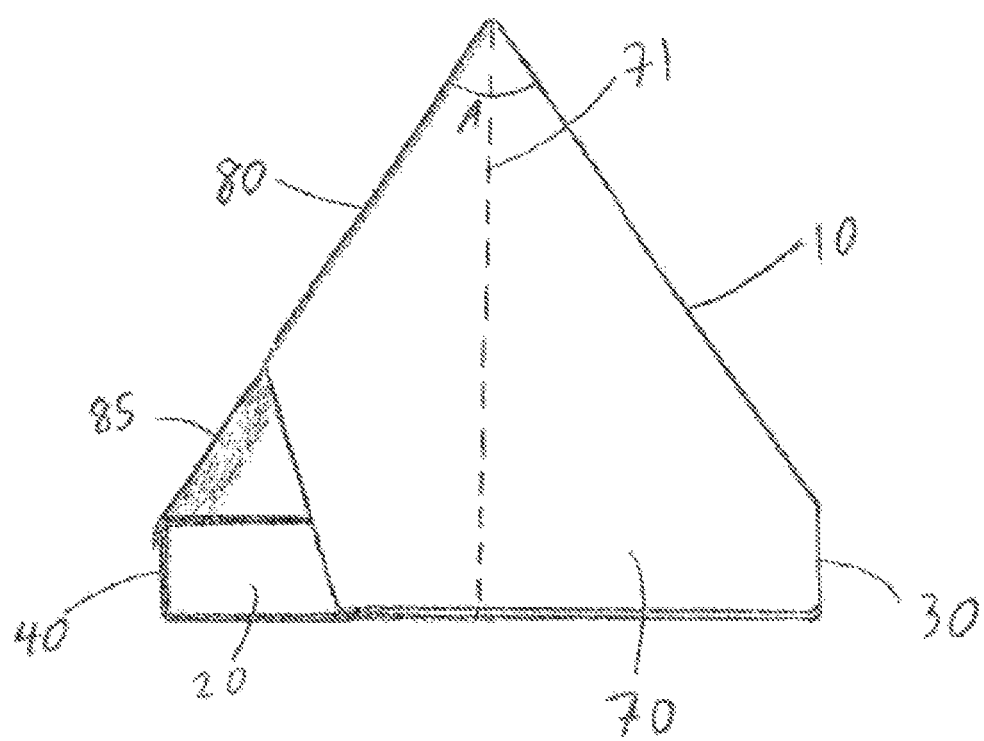
FIG. 6 illustrates a side vide of an embodiment of the case in an enclosing configuration.

When in the enclosing configuration, the top portion 10 and the front wall 80 define an acute angle A. FIG. 6 shows one example of the acute angle A defined by the top portion 10 and the front wall 80. In a typical embodiment, the case will be dimensioned so that when the case 1 is in the enclosing configuration, the angle A defined by the top portion 10 and the front wall 80 will not exceed 90 degrees. In the enclosing configuration shown in FIG. 2, the side walls 70 and the front wall 80 are extended. In the embodiment shown in FIG. 2, when the side walls 70 are extended, side wall folds 71 are substantially orthogonal to the bottom portion when the case 1 is in the enclosing configuration. The front wall 80, top portion 10, and bottom portion 50 define a substantially triangular shape when the case 1 is in an enclosing configuration. FIG. 6 illustrates this substantially triangular shape of the case 1. The front wall 80 is arranged to help substantially enclose the portable computing device. In some embodiments, as shown in FIG. 2, the front wall 80 is arranged to include small openings that allow for some external lighting to illuminate the portable computing device. In certain embodiments, these openings can be controllable, through movable panels or the like, to control the degree of opening. This is desirable for devices, like electronic book readers, that might require some external lighting to operate effectively, or to provide access to control portions (either physical buttons or portions of a touch screen on the computing device, for example).

Figure 4:
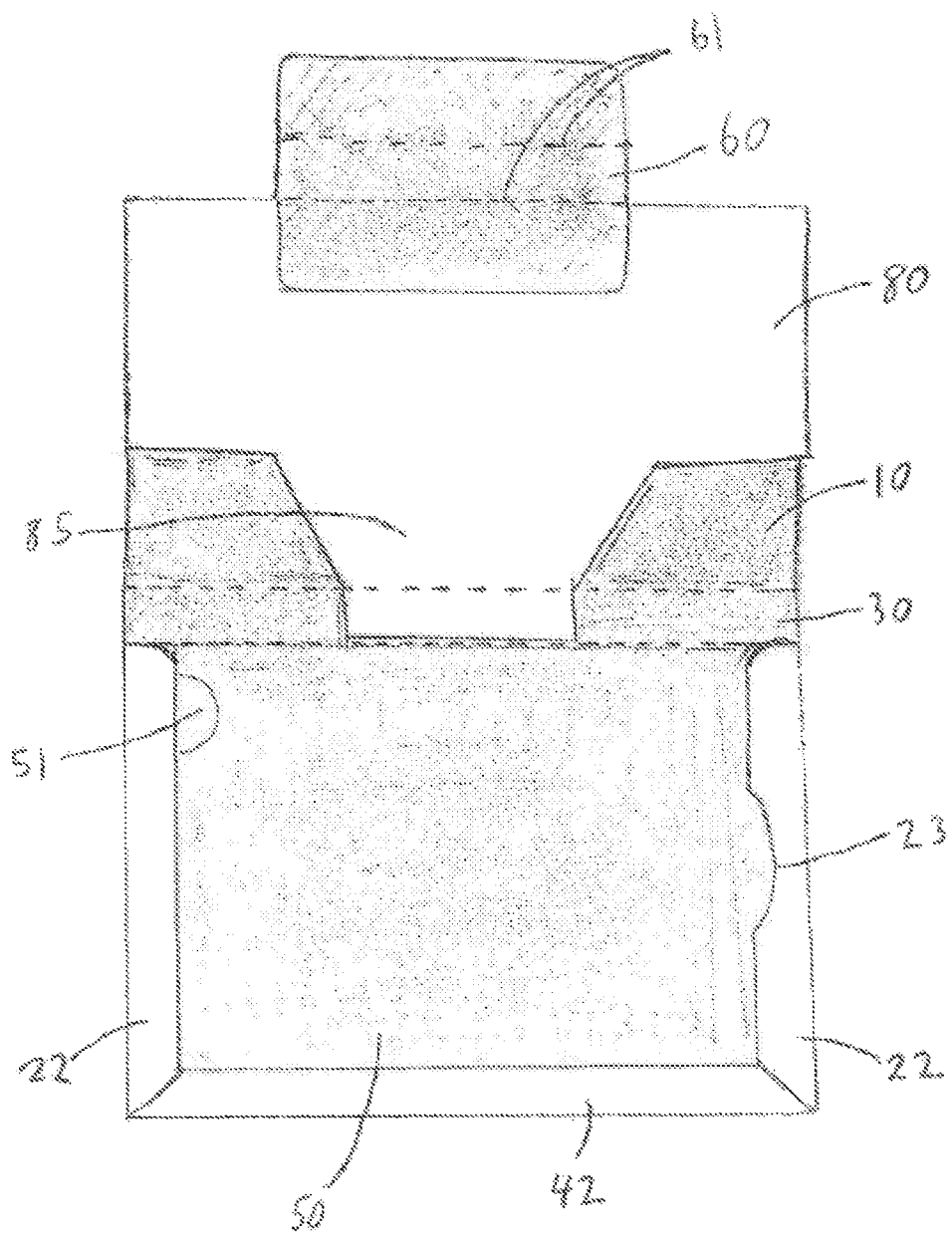
FIG. 4 illustrates the embodiment of the case shown in FIG. 1 in a loading configuration.
Figure 5:
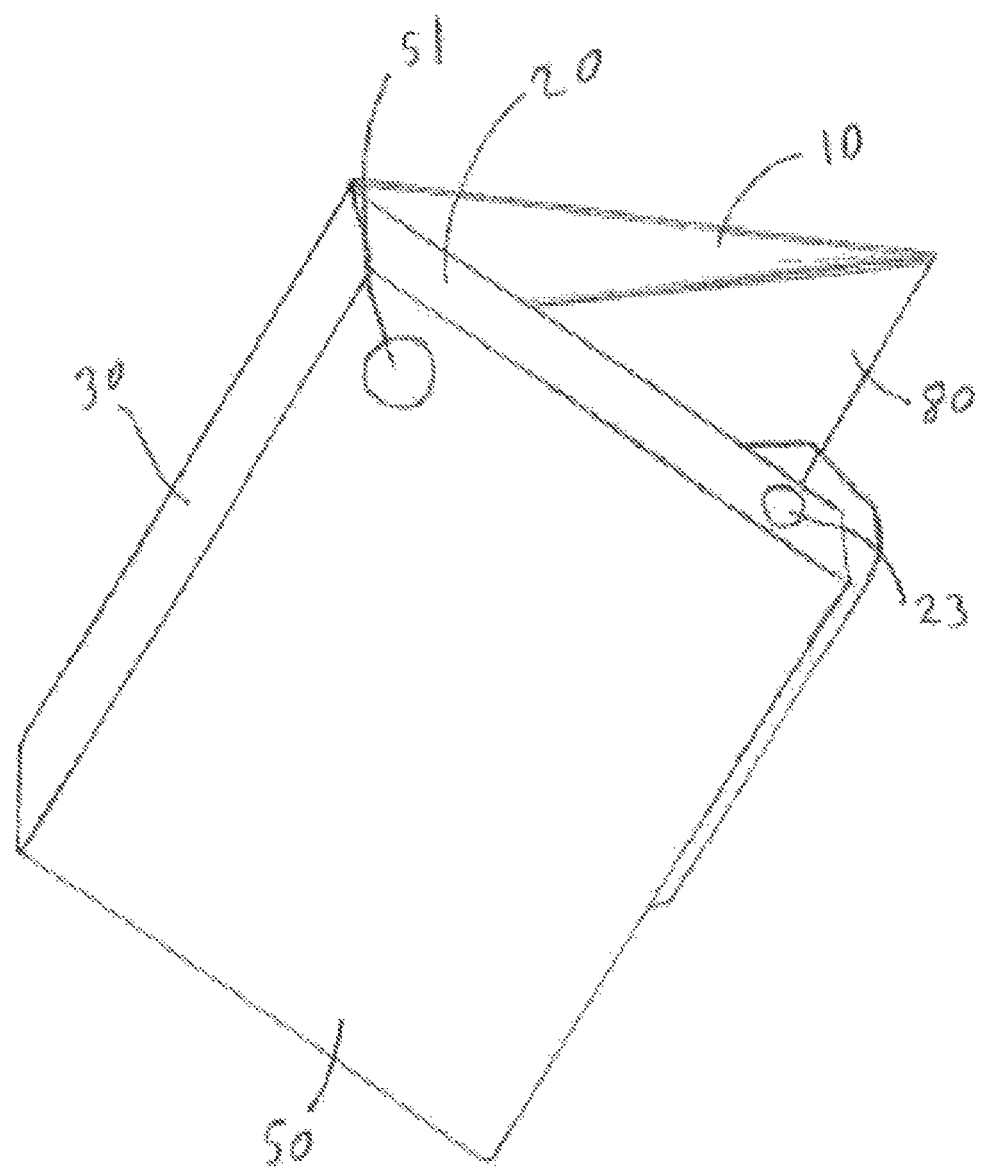
FIG. 5 illustrates the embodiment of the case shown in FIG. 1 in a partially opened carrying configuration.

In the illustrated embodiments, the side wall folds 71 help the side wall 70 collapse in a compact manner when the case 1 is not in the enclosing configuration. When the side walls 70 are collapsed in a compact manner, the front wall 80 is positioned adjacent to the top portion 10. FIG. 4 depicts one embodiment where the front wall 80 is held next to the top portion 10 by the collapsed side walls 70. FIG. 5 illustrates how one may separate the front wall 80 from the top portion 10 when converting the case 1 from the carrying configuration to the enclosing configuration. Other methods of compactly stowing the various portions of the case 1 are known in the art and are not specifically enumerated here.

Figure 3:
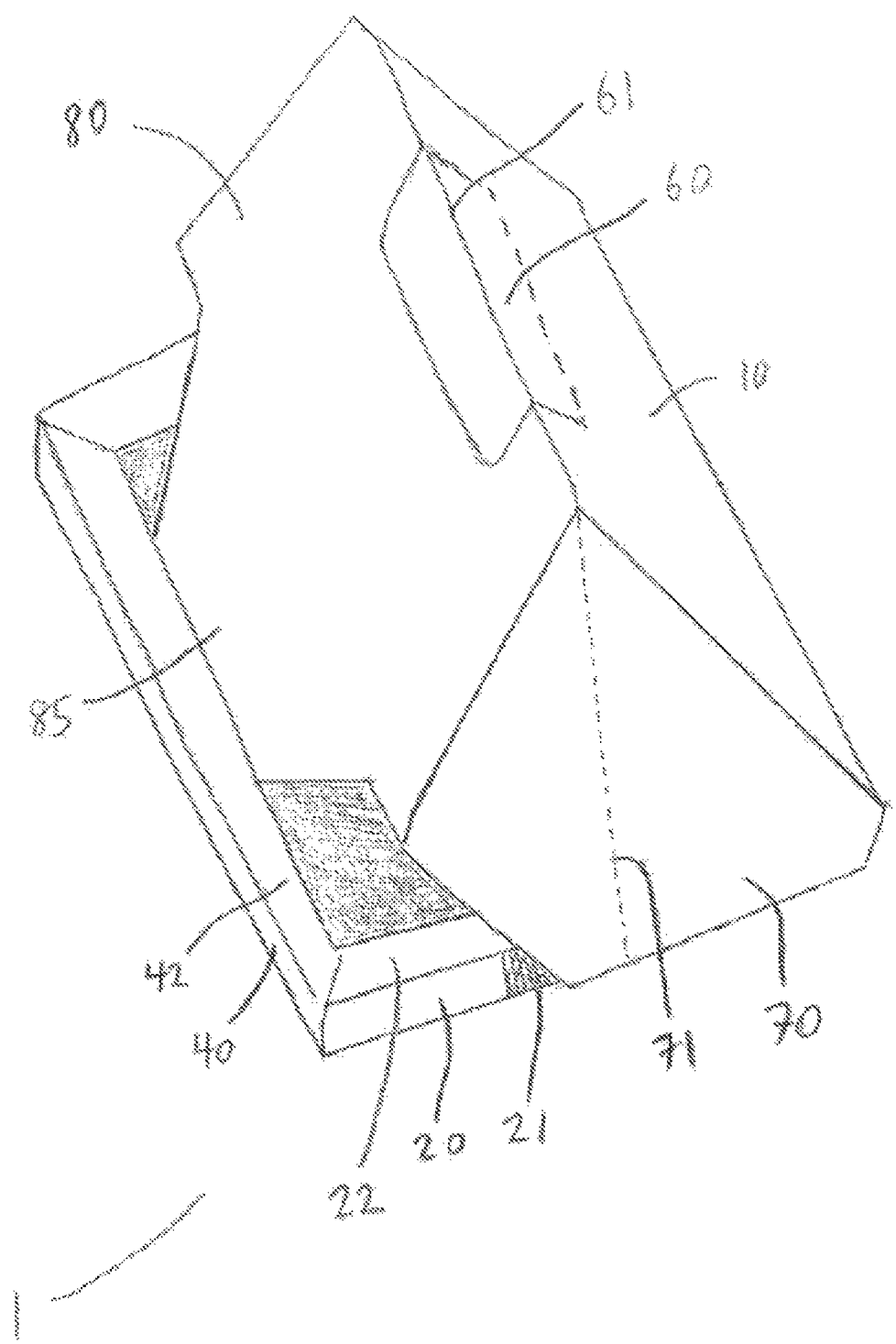
FIG. 3 illustrates another embodiment of the case in an enclosing configuration.

A front wall latch 85 is shown in FIG. 2 and helps ensure that the enclosing configuration of the case 1 is maintained. In particular, the front wall latch 85 is attached to the front portion 40 so that the substantially triangular shape of the case 1 in the enclosing configuration, shown in FIG. 6, is maintained without requiring the user to consciously maintain the particular shape of the case 1. Another embodiment of the front wall latch 85 is shown in FIG. 3. Both embodiments of the front latch 85 shown in FIGS. 2 and 3 serve the function of maintaining the shape of the case 1 in the enclosing configuration. The front latch 85 may be attached to the front portion 40 by way of any fastening means known in the art that may be secured and unsecured repeatedly and easily. One embodiment of the case 1 may use magnets embedded in both the front wall latch 85 and the front portion 40 so that the front wall latch 85 can be secured to the front portion 40 by simply bringing the portions into contact with each other. Alternate embodiments may use Velcro, buttons, hooks, or other devices known in the art.

The embodiment shown in FIGS. 2 and 3 include at least one side portion 20 that includes a side portion surface feature 21. The side portion surface feature 21 helps maintain the enclosing configuration for the case 1 by helping ensure the side wall 70 remains in a fixed position relative to the side portions 20. The surface features 21 may increase the static friction coefficient so that the side wall 70 remains in a fixed position relative to the side portions 20. In one embodiment, the side portion surface feature 21 faces a corresponding surface feature on the interior of the side wall 70 that helps further increase the static friction coefficient so that the enclosing configuration is maintained by ensuring the side wall 70 remains in a fixed position relative to the side portions 20. Other methods of ensuring the side wall 70 remains in a fixed position relative to the side portions 20 are known in the art and are not specifically enumerated here.

The case 1 in enclosing configuration shown in FIGS. 2, 3, and 6 helps obstruct external light and provides a darkened enclosure for the portable computing device. The darkened enclosure is desirable in circumstances where external light would impair a user's ability to enjoy a rich interactive contact in a comfortable manner. The enclosure also helps provide privacy for a user so that the ability to eavesdrop on the content being viewed on the portable computing device may be reduced. While in the enclosing configuration, the case 1 fully supports the weight of the portable computing device so that the user may concentrate on viewing and operating the portable computing device while knowing that the portable computing device is securely held in the case. The front wall latch 85 helps support the weight of the portable computing device. The side portion surface features 21 along with any corresponding surfaces on the side walls 70 also help support the weight of the portable computing device and help maintain the case 1 in the enclosing configuration. Other methods of maintaining the configuration of the case 1 are known in the art and are not specifically enumerated here. In an alternate embodiment, the surface feature 21 instead provides access to a charging port of the portable computing device.

FIG. 2 shows an aperture cover 60 in an opened position. The aperture cover 60 is configured to fold over to close an aperture and to fold away to open the aperture. The aperture cover 60 may include multiple features 61 that allow the aperture cover 60 to bend at multiple locations. FIG. 3 shows the aperture cover 60 in a closed position where the aperture cover 60 is substantially flush with the top portion 10 and the front wall 80. The aperture is configured to allow a user to view the portable computing device that is enclosed when the case 1 is in the enclosing configuration. In one embodiment, the aperture is defined by a gasket that helps provide an ergonomic seal between the case 1 and the user. In an exemplary embodiment, the gasket is made of material that helps provide a seal between the aperture and the user so that external lighting is reduced from entering, or cannot enter, the case 1 and interfere with the viewing of the personal computing device when the case is in the enclosing configuration.

When the case 1 is configured in this manner, the external light that illuminates the display of the portable computing device is substantially reduced. A user viewing the portable computing device through the aperture will see the portable computing device in a darkened environment, even when the surrounding environment is well lit. A user viewing the portable computing device through the aperture will also have a reduced view of the surrounding environment due to the top portion 10, the front wall 80, the side walls 70, and the bottom portion 50 forming an enclosure for the portable computing device.

FIG. 4 shows the embodiment of the case shown in FIG. 1 in a loading configuration. When the case 1 is in a loading configuration, the top portion 10, back portion 30, and bottom portion 50 are arranged in a coplanar fashion. In the depicted embodiment, the front wall 80 is arranged in a stowed and collapsed position adjacent to the top portion 10. The side walls 70 are also stowed and collapsed position between the front wall 80 and the top portion 10. The aperture cover 60 is shown in an opened position. In this configuration, the portable computing device may be inserted in a direction from the aperture cover 60 towards the front portion 40 so that the portable computing device is secured in the case 1. In an alternate embodiment, the case 1 may include at least one side portion 22 or a front portion 40 that includes a flap that allows for another means of loading and securing the portable computing device in the case 1. This may be desirable when, for example, the case is in the enclosing configuration and it is desired to view the surroundings through the portable computing device's camera device.

FIG. 5 shows the embodiment of the case 1 illustrated in FIG. 4 in the loading configuration transitioning to a carrying configuration like that shown in FIG. 1. In other words, the case 1 is being changed from the configuration shown in FIG. 4 to the configuration shown in FIG. 1. The front wall 80 is depicted slightly separated from the top portion 10 to illustrate how the front wall 80 may be connected to the top portion 10.

A securing mechanism may be included to help further secure the portable computing device within the case 1. One example of a securing device comprises additional surfaces parallel to the bottom portion 50 so that the portable computing device is positioned between the additional surfaces and the bottom portion 50. FIGS. 2-4 illustrate a securing mechanism that includes two side portion securing portions 22 and a front portion securing portion 42. The two side portion securing portions extend from the side portion forming a J-shaped enclosure defined by the bottom portion 50, the side portion 20, and the side portion securing portion 22. The front portion securing portion 42 extends from the front portion 40 forming a J-shaped enclosure defined by the bottom portion 50, the front portion 40, and the front portion securing portion 42. These surfaces help secure the portable computing device in the case 1. In an alternate embodiment, the side portion securing portion 22 includes a surface feature 23, as shown in FIG. 4. Such surface features may be included on the side portion securing portions 22, the front portion securing portion 42, or any other surface as is desirable. The surface features may serve ornamental purposes, or may be included to reduce weight or other desirable purposes.

In an alternate embodiment, at least one of the side portion securing portions and front portion securing portion is configured to provide a snap fit. In other words, one of the portions may be adjusted to apply a physical friction fit between the case and the portable computing device, helping to secure the portable computing device within the case. The snap fit helps ensure the portable computing device remains in a consistent position when the device is being carried in the case 1.

In an alternate embodiment, pliable material may line the interior of the case 1 in a manner that provides the pliable material between the interior surfaces of the case 1 and the surfaces of the portable computing device. The pliable material of these embodiments of the case 1 may be considered to be part of the securing mechanism because the pliable material helps ensure the portable computing device remains in a consistent position being carried or enclosed in the case 1. In one such embodiment, the portable computing device is inserted by the user which causes the pliable material lining the interior of the case 1 to deform.

The securing mechanism may also comprise an opening in at least one of the side portions 20, front portion 40, or bottom portion 50. FIGS. 2 and 5 illustrate embodiments that include examples of such openings including front portion openings 41, a side portion opening 23, or a bottom portion opening 51. The openings provide positions that allow for additional securing devices to be secured to the case 1 so that the portable computing device remains in a consistent position when being carried or enclosed in the case 1. In one embodiment, elastic securing devices are secured to the case 1 in a removable manner at an opening. This allows the securing mechanism to be easily adjusted to secure the portable computing device in the desired manner.

The case 1 may be formed in an integral manner. In such an embodiment, the case 1 can be made of one continuous piece of material. Such embodiments may be used in circumstances where a low cost of manufacture is essential. Such embodiments may be formed in a manner that includes surface features like folds 61, 71 which help facilitate the formation of the case 1. In other embodiments, the case 1 may be formed from multiple different pieces, allowing for a person of ordinary skill in the art to choose the most suitable material for each portion of the case 1.

The case 1 may be made of any suitable material known in the art. In one embodiment, the case 1 is made of leather, a leather-like material and/or fabric. In an alternate embodiment, the case 1 is made of a plastic or metallic material. In another embodiment, the case 1 is made of a paper or paperboard material. Various combinations of these materials selected for form, function and design are within the scope of this disclosure. Embodiments of the case will have particular surfaces that are defined as the exterior and the interior surfaces. In some embodiments, surface indicia may be included on the interior or the exterior surfaces of the case. These indicia may provide identification, branding, maps, instructions, decoration, and/or other information. The material used to form the case 1 maintains the specific shape of the case 1. In alternate embodiments, the material may provide protection to the portable computing device. In further embodiments, the case may be made of multiple layers of material with different properties. For example, the outermost layer may an environmentally resilient waterproof outer plastic layer. Other layers may include pliable materials that provide shock absorption and securing attributes, or structurally resilient materials that provide structure to the case. The innermost layer is desirably made of a material that will not affect the finish of the portable computing device while still securely holding the portable computing device. Still further layers may provide a variety of other attributes known to people of skill in the art.

The case 1 may include other aspects that facilitate the use of the case 1 as a means of carrying and enclosing the portable computing device. In an alternative embodiment, features are included that allow the case 1 to be elevated in a manner that facilitates viewing. These features may include a removable stand, a retractable stand, or other structures known in the art. A stand, for example, allows the case to achieve an additional standing configuration that allows the user to view the portable computing device without requiring the user to continuously provide support the case 1 to achieve an optimal viewing angle. In a further embodiment, features may include a handle or a strap that facilitates the carrying of the case 1. These and other features may be arranged on any of the external surfaces of the case 1 to facilitate ease of use by the user.

In a further embodiment, a sunshade may be attachable to the case 1. Such a sunshade would allow the user to further prevent the entry of external lighting into the enclosure defined by the case 1 in the enclosing configuration. Such a sunshade may be made of a lightweight material that can easily assume a shape that facilitates the obstruction of external lighting. Such a sunshade may also provide additional privacy for the user while using the portable computing device.

Figure 7:
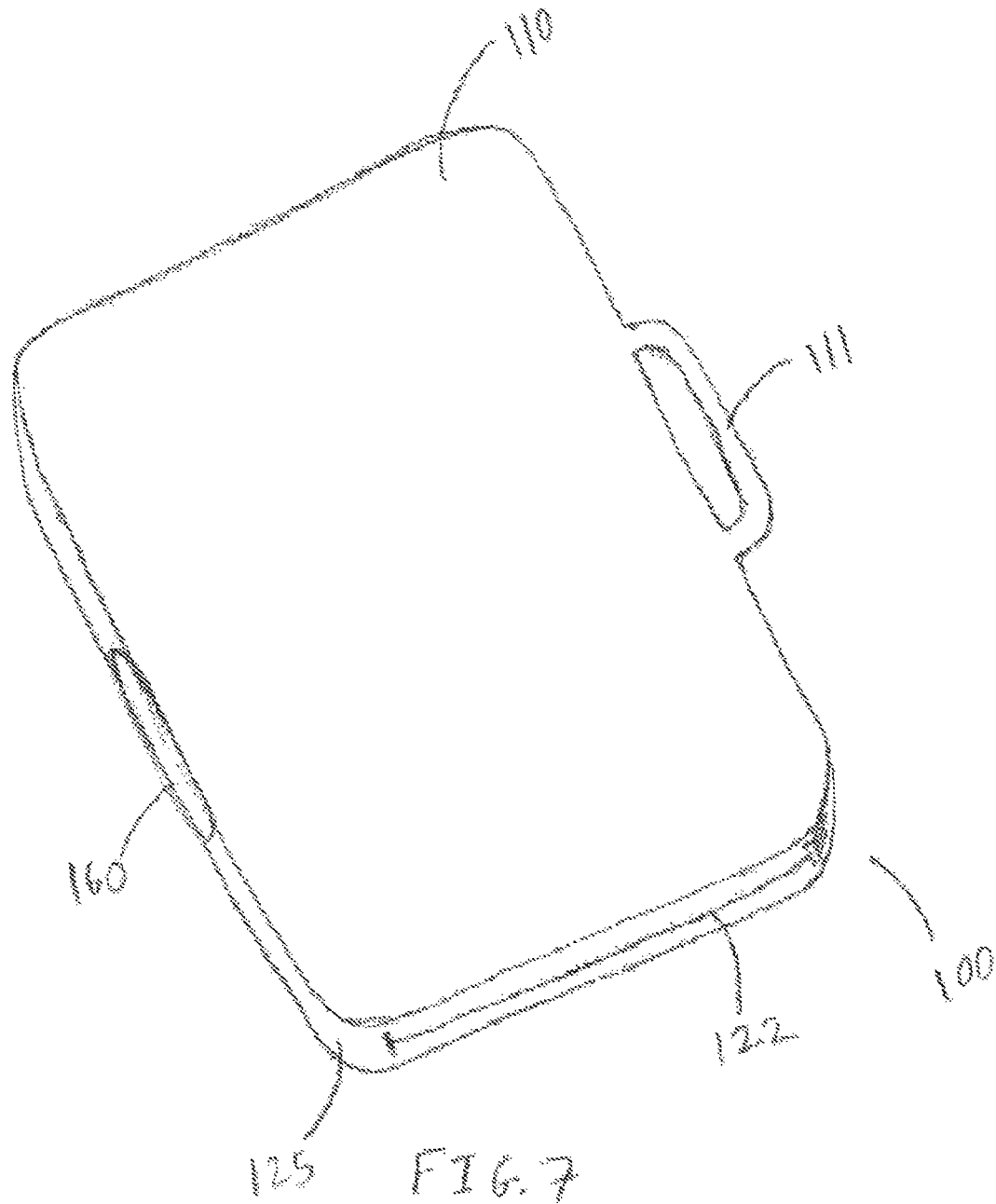
FIG. 7 illustrates a second embodiment of the case in a carrying configuration.

FIG. 7 depicts another embodiment of the case 100 in the closed configuration. The case 100 includes a top portion 110 and an enclosing portion 125. The case 100 is made of a conforming material that securely fits the portable computing device. FIG. 7 depicts an embodiment of the case 100 that has an enclosing bottom portion 125. The enclosing bottom portion 125 structurally integrates the back portion, bottom portion, and side portions described for the embodiment shown in FIG. 1. In an alternate embodiment, the enclosing bottom portion 125 may include at least one of the back portion, bottom portion, and side portions that is structurally distinct with the enclosing bottom portion 125. For example, the enclosing bottom portion may include a separate and structurally distinct back portion to provide additional support for the portable computing device.

The embodiment of the case 100 shown in FIG. 7 also includes a case securing device. The case securing device may comprise a zipper 122. The zipper 122 secures an opening of the case 100 that allows for easy insertion and removal of the portable computing device. In an alternate embodiment, the case securing device may comprise stretchable and pliable portions of the case 100 that allow for easy insertion and removal of the portable computing device.

FIG. 7 also illustrates a handle 111. The handle 111 helps facilitate the carrying of the case 100 with the portable computing device, particularly when the case 100 is in the carrying configuration. The handle 111 may be made of the same material as the case 100 or of a different material. The handle 111 may include ridges or other surface features that facilitate secure gripping. The handle 111 is illustrated as being a part of the top portion 110 in FIG. 7. When extending from the top portion 110, the handle 111 can also function as a stop for the top portion 110 to prevent excessive rotation of the top portion 110. The handle 111 may, however, be positioned to extend from any surface of the case 100.

Figure 8:
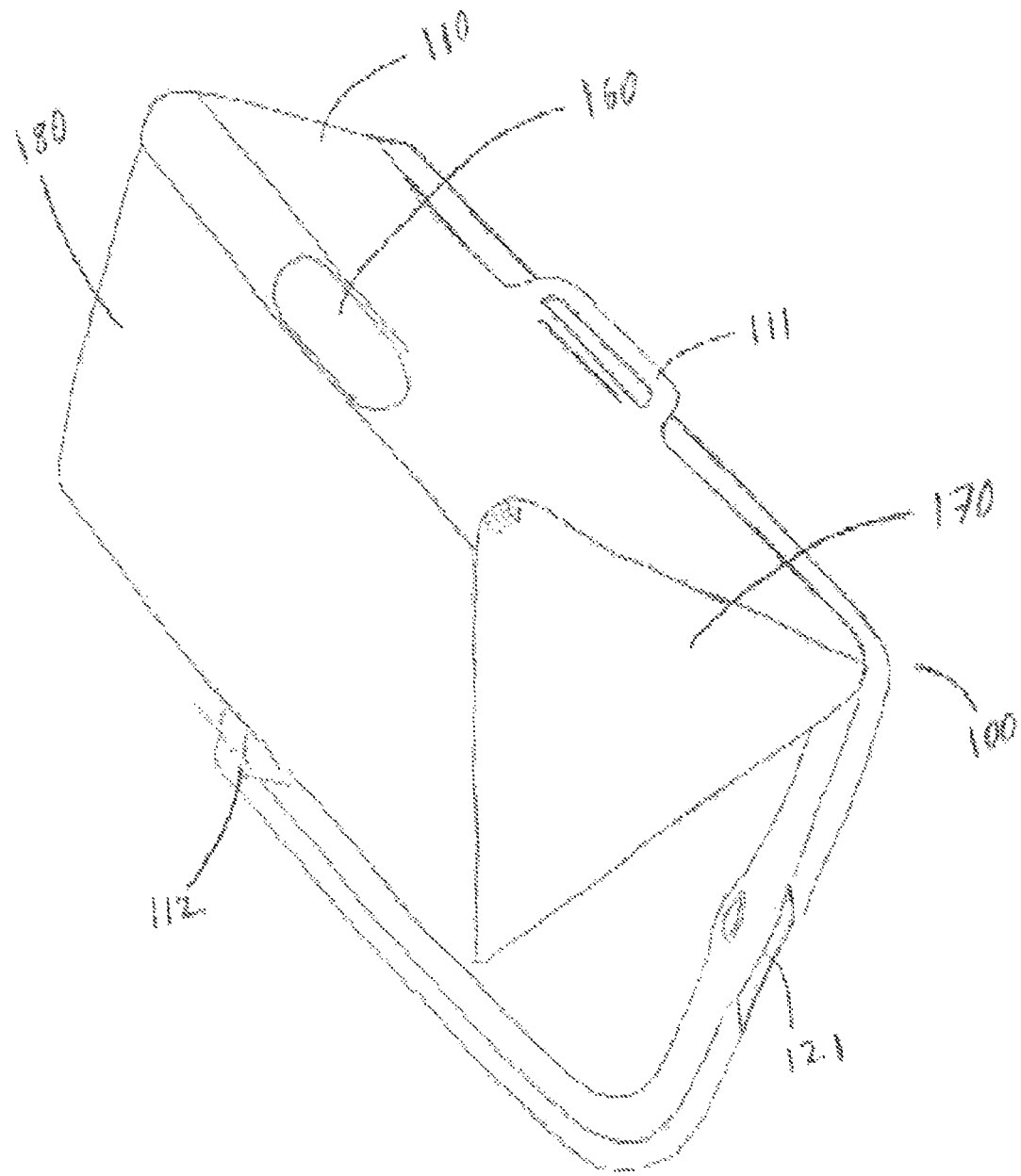
FIG. 8 illustrates the second embodiment of the case in an enclosing configuration.

FIG. 8 illustrates the case 100 in a partial enclosing configuration. The front wall 180 is removed from the top portion 110 so that the side walls 170 are extended. An aperture 160 is formed between the top portion 110 and the front wall 180. The aperture 160 is configured to allow a user to view the portable computing device that is enclosed when the case 100 is in the enclosing configuration. In one embodiment, the aperture is defined by a gasket that helps provide an ergonomic seal between the case 100 and the user. FIG. 8 also illustrates a surface feature 121 that helps support the weight of the computing device and helps maintain the case 1 in the enclosing configuration. In an alternate embodiment, the surface feature 121 may instead provide access to a charging port of the portable computing device.

Figure 9:
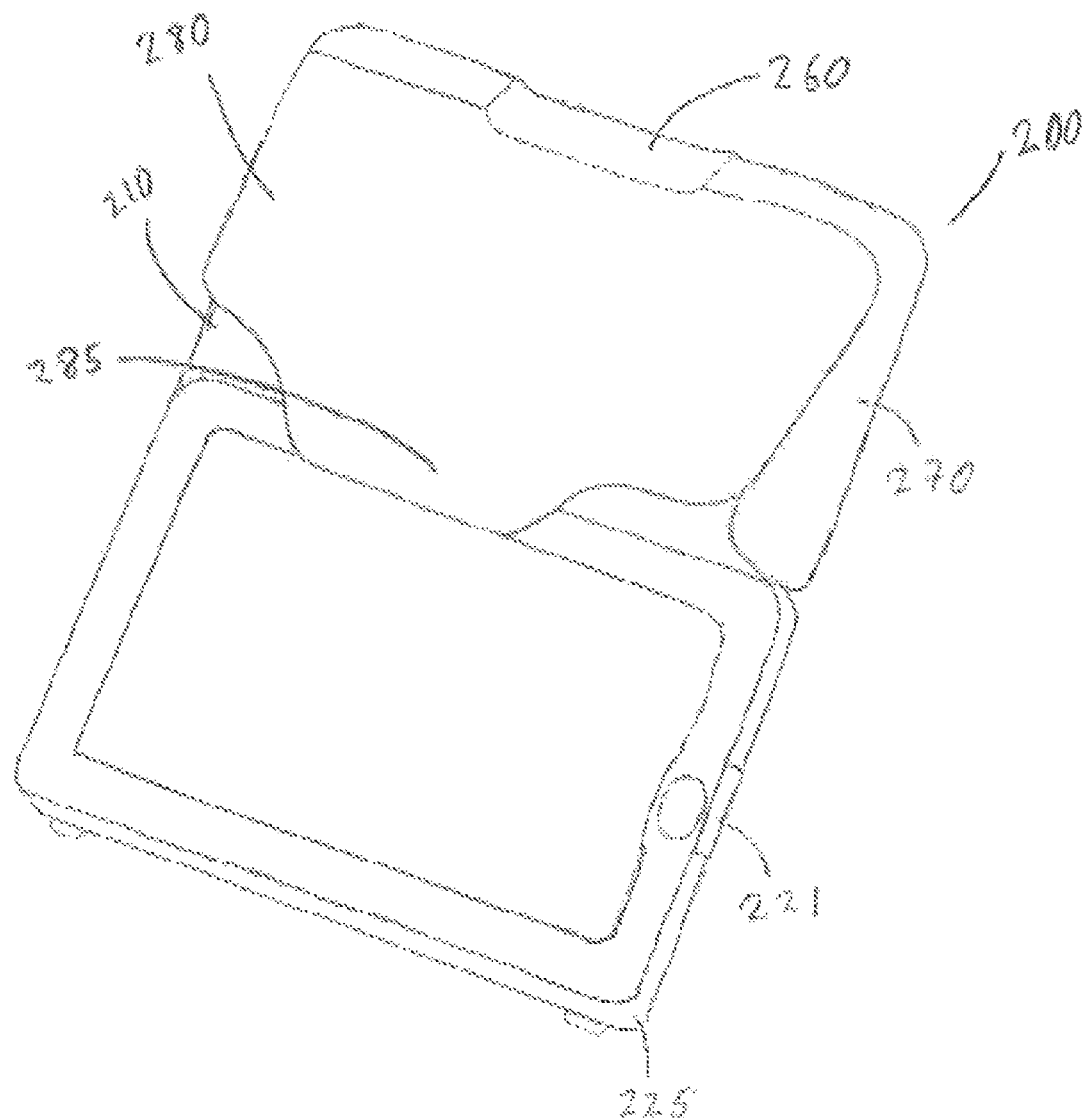
FIG. 9 illustrates a third embodiment of the case with a top hinged shade.

FIG. 9 depicts another embodiment of the case 200 in an opened configuration. The side walls 270 are slightly extended so that the front wall 280 is separated from the top portion 210. An aperture 260 is formed between the top portion 210 and the front wall 280. A front wall latch 285 helps ensure that the enclosing configuration of the case 200 is maintained. A surface feature 221 is formed in the enclosing portion 225 to help support the weight of the portable computing device and helps maintain the case 200 in the enclosing configuration. In an alternate embodiment, the surface feature 221 may instead provide access to a charging port of the portable computing device through the enclosing portion 225.

Figure 10:
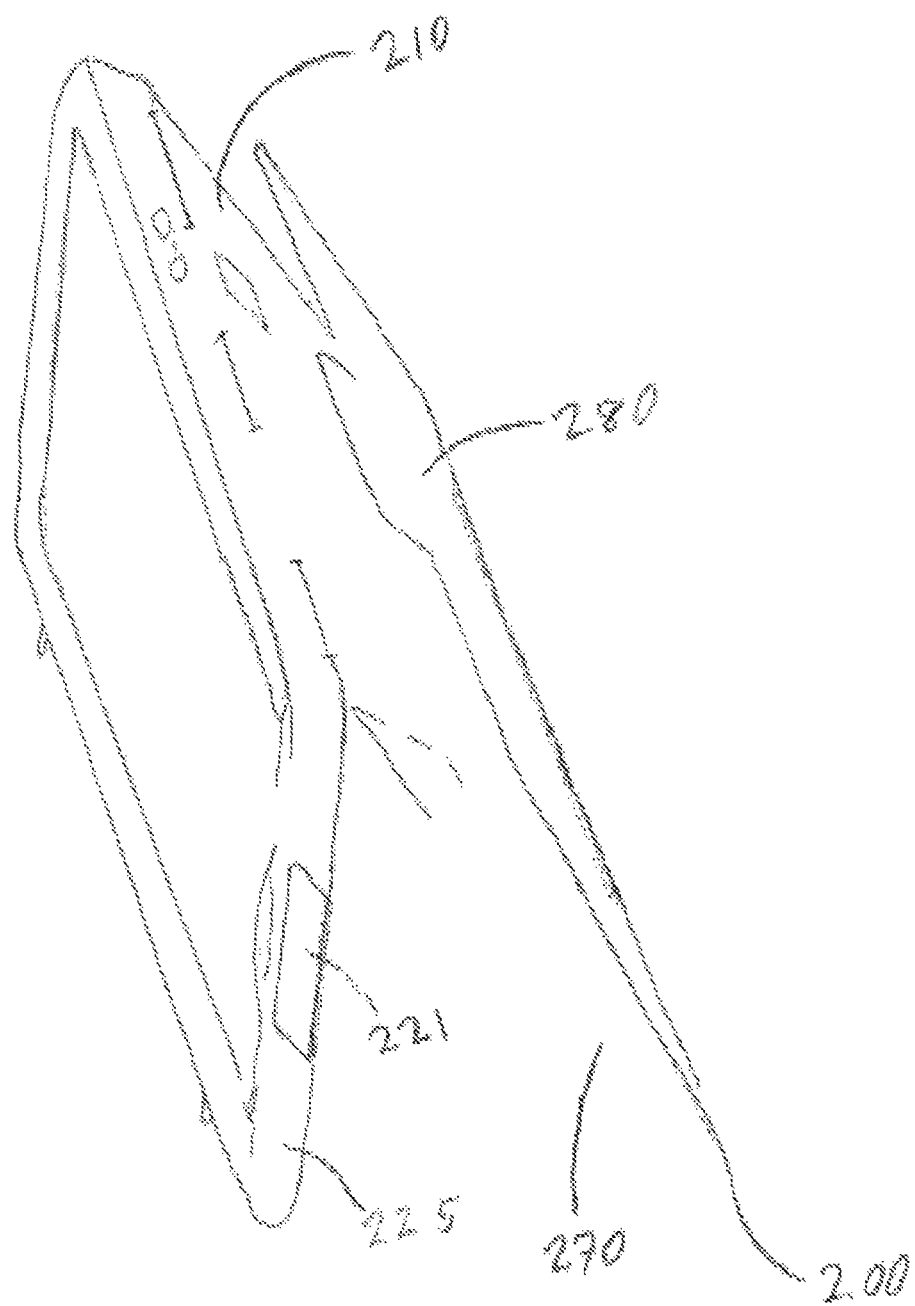
FIG. 10 illustrates the third embodiment of the case arranged in a standing configuration.

FIG. 10 illustrates the case 200 in a standing configuration. The enclosing portion 225 holds the portable computing device while the top portion 210, the bottom portion 280, and the side walls 270 form a stand that supports the enclosing portion 225. This allows the portable computing device to be positioned in a manner that is desirable for viewing by a typical individual. The case 200 may allow for multiple standing configurations so that the user may select the most desirable configuration for their situation.

Figure 11:
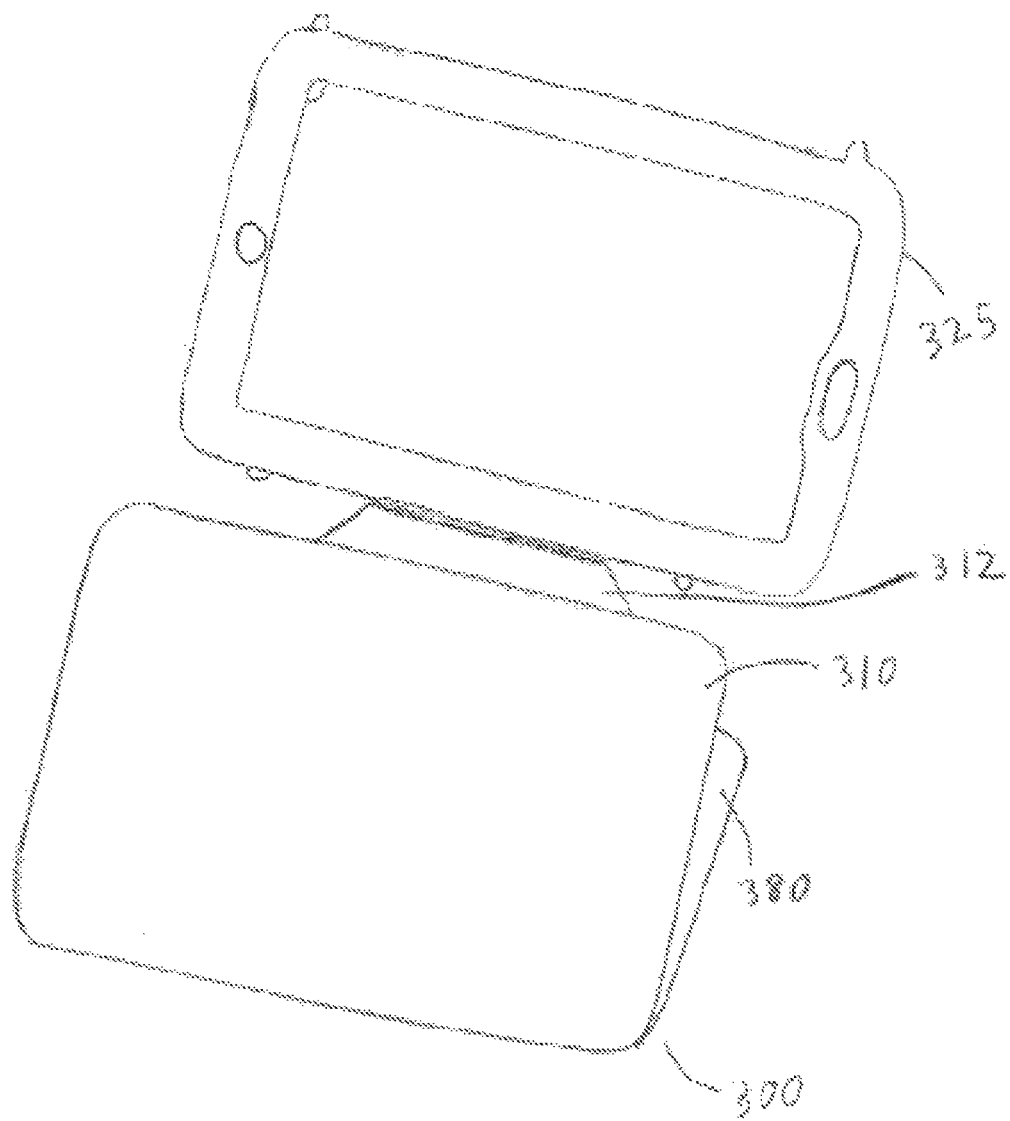
FIG. 11 illustrates a fourth embodiment of the case in an opened configuration.
Figure 12:
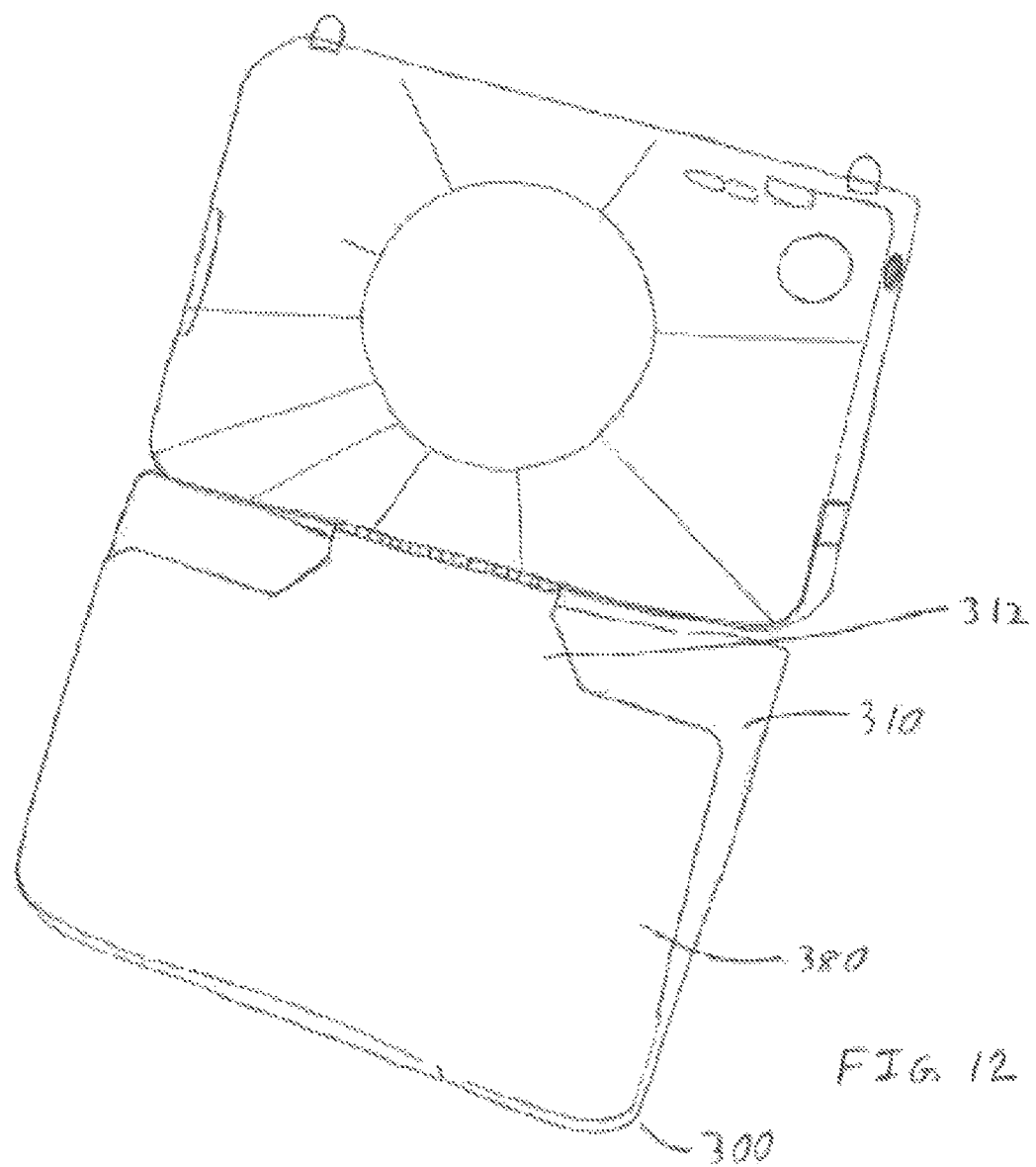
FIG. 12 illustrates another view of the fourth embodiment of the case in FIG. 11.

FIG. 11 depicts another embodiment of case 300 in the opened configuration. The case 300 includes a hinge 312 that allows for the top portion 310 and the front wall 380 to rotate around the enclosing portion 325 that holds the portable computing device. FIG. 12 depicts another view of the embodiment shown in FIG. 11. The case 300 may include additional ports, openings, and other features so that different aspects of the portable computing device may be accessed. These may include physical buttons or switches. The case 300 may also include surface indicia, as shown in FIG. 12.

Figure 13:
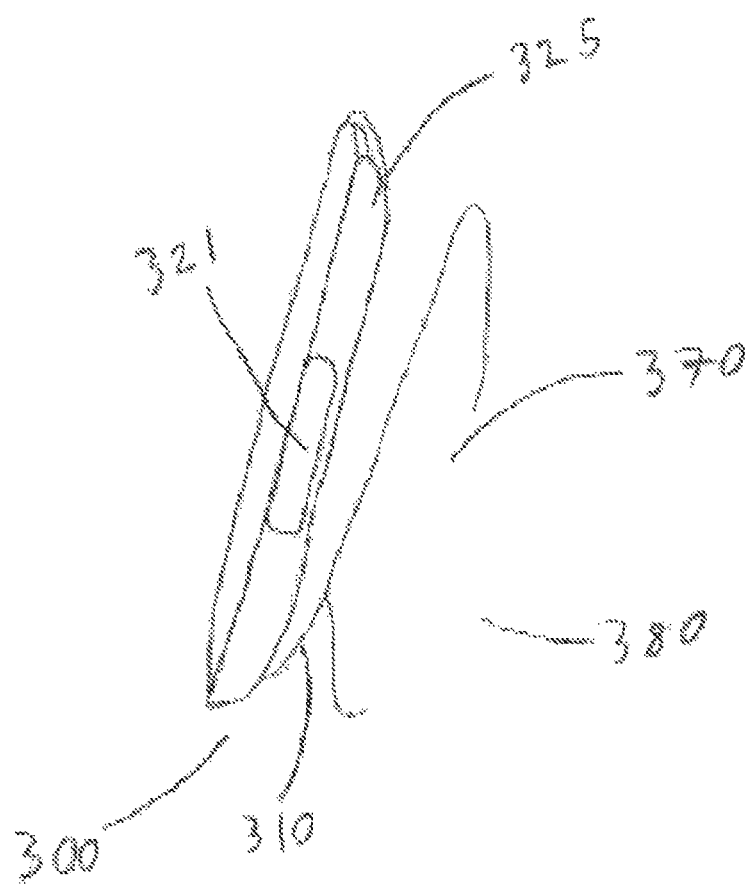
FIG. 13 illustrates the fourth embodiment of the case in a standing configuration.

FIG. 13 depicts the case 300 in a standing configuration. The hinge 312 is configured so that the front wall 380 and the top portion 310 provide a stand for operating the portable computing device. The case 300 presents the portable computing device being held in the enclosing portion 325 in a manner that is desirable for viewing by a typical individual. The case 300 may provide means for adjusting the standing configuration so that the portable computing device is presented in a manner desirable for viewing.

The hinge 312, as shown in FIGS. 11-13 allows for the top portion 310 and the front wall 380 to be rotated about the portable computing device being held in the enclosing portion 325 freely. The hinge 312 may be configured to allow the top portion 310 of the case 300 to be positioned so that the enclosing bottom portion 325 is disposed between the portable computing device and the top portion 310. The hinge 312 may be attached to the top portion 312, the front wall 380, or another position that facilitates the use of the case 300 with the portable computing device. For example, the hinge 312 may be positioned on the side walls of the case 300. In an alternate embodiment, the hinge 312 may be positioned on the top or bottom wall between the side walls of the case 300. The hinge 312 is adapted to fit inside the edge of the case 300 so that the top portion 310 and the front wall 380 fold flat against the portable computing device. The hinge 312 also facilitates the standing configuration illustrated in FIG. 13. The hinge 312 may be made of a stretch material or any other appropriate material that does not damage the portable computing device when used with the case 300.

Figure 14:
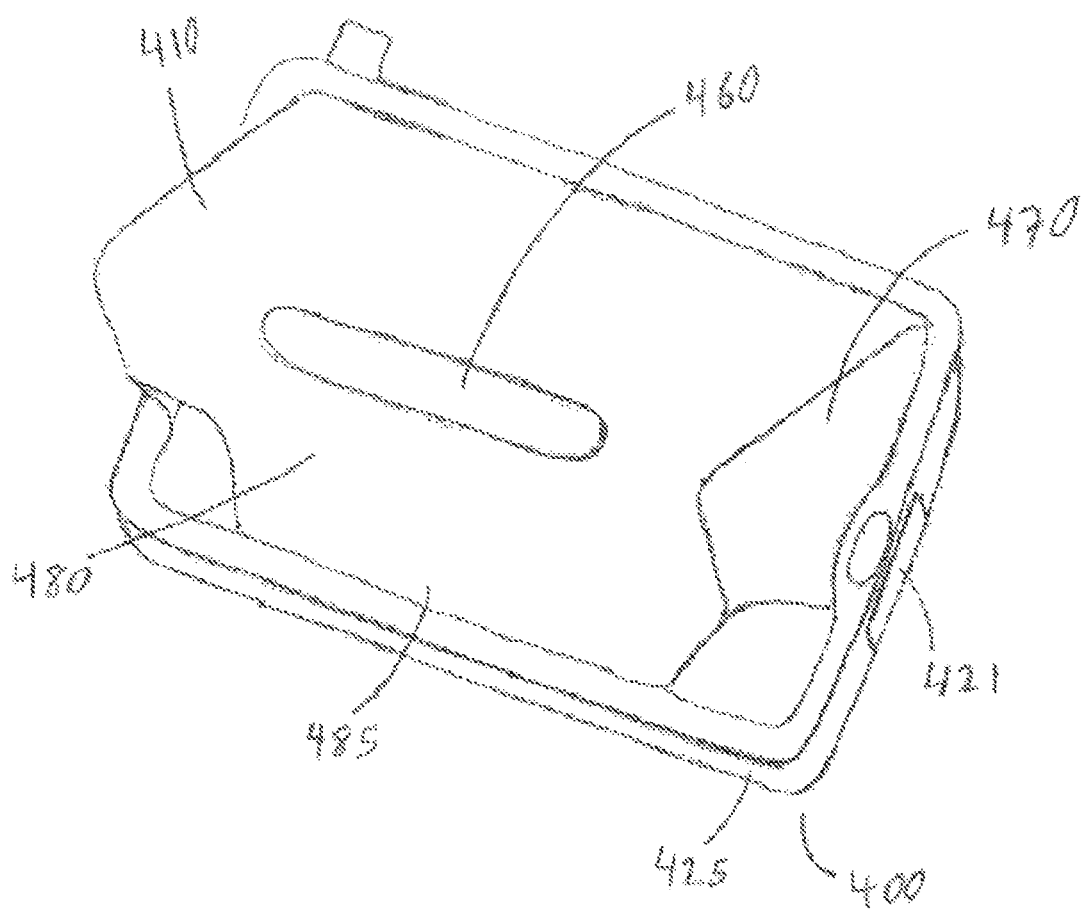
FIG. 14 illustrates a fifth embodiment of the case in an enclosing configuration.

FIG. 14 illustrates a fifth embodiment of the case 400. This embodiment of the case 400 has a top portion 410 and a front wall 480 that may be rotated to be positioned behind the enclosing portion 425. In other words, the top portion 410 and the front wall 480 may be rotated so that the enclosing portion 425 is disposed on one side of the top portion 410 and the front wall 480 is disposed on another side of the top portion 410. In this embodiment of the case 400, the top portion 410 and front wall 480 are sized so that when the top portion 410 and the front wall 480 are rotated to be positioned behind the enclosing portion 425, the portable computing device may still achieve an unobstructed view of the surroundings through a camera opening located on the enclosing portion 425.

The cases 1, 100, 200, 300, and 400 are particularly suited for augmented reality applications, particularly those involving outdoor activities. See, for example, U.S. Patent Application No. 2013/0130813 (Ackley); U.S. Patent Application No. 2013/0095924 (Geisner); and U.S. Patent Application No. 2013/0093788 (Liu), for instance, herein incorporated by reference. As would be readily understood by those skilled in the art, the portable computing device would have a digital camera, a processor and a memory. The portable computing device would be housed within the top portion, the side portions, the front portion and the back portion, and would display both a current view of that is within the viewing range of the digital camera, as well as images of objects generated by the portable computing device to create an augmented reality.

Figure 15:
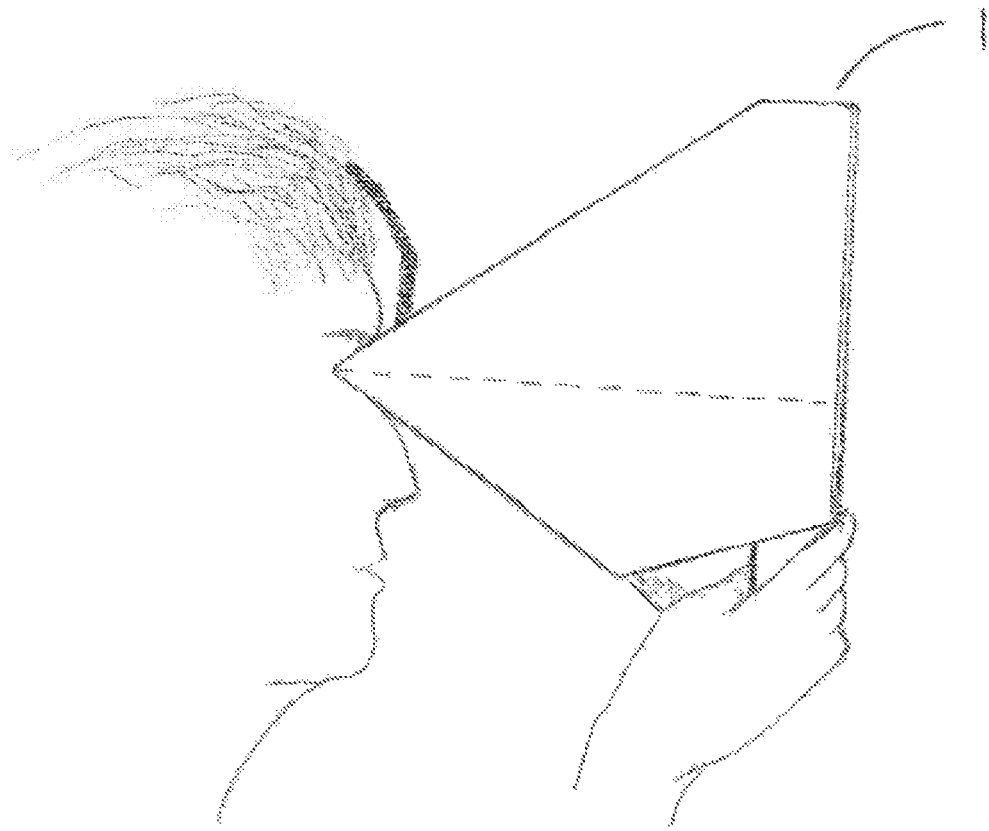
FIG. 15 illustrates the case illustrated in FIG. 6 in use by a user.

For instance, the augmented reality applications can involve looking at the computing device display screen outdoors on a sunny day. Without the sun shade case 1, the reflection and glare of on the display surface would prevent or cause eye strain on the user wishing to see the content on the screen. As shown in FIG. 15, the user can be on an open field, e.g., an historic battlefield, look through the top 10 to the display screen to see the field through the camera function on the computer device, as augmented, for instance, by historic films, avatars or reinactors that recreate a historic battle. The determined geographic location (GPS, cell tower or WiFi derived location information) and orientation (through the magnetic/compass function) can govern what is displayed, such that as one walks about and rotates, various perspectives can be viewed. An interactive map application, either separate or integral with the augmented reality application can direct the user to the next viewing location. Various events can be viewed by selecting a particular day or historic event, but allowing the user to shift through time for a particular location. Thus, while being in the actual environment, a user can have an experience that simulated an imbedded, interactive, location and time-shifted experience of a recreated historic event. Of course, the case 1 permits many other applications to be viewed, not just applications directed to history, such as virtual reality games and other educational content.

The case 1, 100, 200, 300, and 400 includes various openings for viewing and accessing the portable computing device. The openings may also be used to attach speakers, chargers, straps, and other devices desirable for use with a case for a portable computing device.

In accordance with various embodiments, there is described herein a case for a portable computing device that includes a bottom portion, a top portion, side portions on opposing sides of the bottom portion, the side portions extending in an upward direction perpendicular to the bottom portion, a front portion extending in the upward direction perpendicular to the bottom portion, the front portion disposed between the side portions, a back portion joining the bottom portion and the top portion, and a front wall connected to the top portion. The case has an enclosing configuration, where the front wall, the top portion, the side portions, the front portion, the back portion, and the bottom portion define an enclosure where the side walls are extended and parallel, the front wall, the top portion, and the bottom portion defining a substantially triangular enclosure. The case has a carrying configuration, where the top portion, the side portions, the front portion, the back portion, and the bottom portion define an enclosure where the top portion is substantially parallel to the bottom portion, and the back portion is disposed parallel to the front portion and extending in the upward direction perpendicular to the bottom portion. The case may optionally have an aperture cover covering an opening formed in the top portion and the front wall, opposing side walls connected to the top portion and the front wall in a collapsible manner. The case aperture cover may be moved to uncover the opening formed in the top portion and the front wall when the case is in the enclosing configuration.

In accordance with further embodiments, it would also be advantageous to have a case for a portable computing device that includes an attachment portion configured to secure the case to the portable computing device, a top portion, side walls on opposing sides of the top portion, a front wall disposed between the side portions and connected to the top portion. There may optionally be an aperture formed in the top portion and the front wall.

It will be understood that the foregoing description is of the exemplary embodiments, and is, therefore, merely representative of the article. It can be appreciated that many variations and modifications of the different embodiments in light of the above teachings will be readily apparent to those skilled in the art. Accordingly, the exemplary embodiments, as well as alternative embodiments, may be made without departing from the spirit and scope of the articles and methods as set forth in the attached claims.

What is claimed is:

1. A case for holding an electronic device comprising:
a bottom portion and a top portion;
side portions disposed on opposing sides of the bottom portion, the side portions extending in an upward direction perpendicular to the bottom portion;
a front portion extending in the upward direction perpendicular to the bottom portion, the front portion disposed between the side portions;

a back portion joining the bottom portion and the top portion;
a front wall connected to the top portion;
opposing side walls connected to the top portion and a front wall in a collapsible manner;
the case having an enclosing configuration, the front wall, the top portion, the side walls, the side portions, the front portion, the back portion, and the bottom portion defining an enclosure where the side walls are extended and parallel, the front wall, the top portion, and the bottom portion defining a substantially triangular enclosure, wherein in the enclosing configuration the front wall and the top portion may be rotated about the enclosure without obstructing the opening formed in the top portion and the front wall; and
the case having a carrying configuration, the top portion, the side portions, the front portion, the back portion, and the bottom portion defining an enclosure where the top portion is substantially parallel to the bottom portion, and the back portion is disposed parallel to the front portion and extending in the upward direction perpendicular to the bottom portion.

2. The case according to claim 1, wherein the case comprising a securing mechanism for securing the electronic device.

3. A case for holding an electronic device comprising:
a bottom portion and a top portion;
side portions disposed on opposing sides of the bottom portion, the side portions extending in an upward direction perpendicular to the bottom portion;
a front portion extending in the upward direction perpendicular to the bottom portion, the front portion disposed between the side portions;
a back portion joining the bottom portion and the top portion;
a front wall connected to the top portion;
opposing side walls connected to the top portion and a front wall in a collapsible manner;
a securing mechanism for securing the electronic device, wherein the securing mechanism comprises a side portion securing portion formed on each side portion and a front portion securing portion formed on the front portion;
the case having an enclosing configuration, the front wall, the top portion, the side walls, the side portions, the front portion, the back portion, and the bottom portion defining an enclosure where the side walls are extended and parallel, the front wall, the top portion, and the bottom portion defining a substantially triangular enclosure; and
the case having a carrying configuration, the top portion, the side portions, the front portion, the back portion, and the bottom portion defining an enclosure where the top portion is substantially parallel to the bottom portion, and the back portion is disposed parallel to the front portion and extending in the upward direction perpendicular to the bottom portion.

4. A case for holding an electronic device comprising:
a bottom portion and a top portion;
side portions disposed on opposing sides of the bottom portion, the side portions extending in an upward direction perpendicular to the bottom portion;
a front portion extending in the upward direction perpendicular to the bottom portion, the front portion disposed between the side portions;
a back portion joining the bottom portion and the top portion;
a front wall connected to the top portion;
opposing side walls connected to the top portion and a front wall in a collapsible manner;
the case having an enclosing configuration, the front wall, the top portion, the side walls, the side portions, the front portion, the back portion, and the bottom portion defining an enclosure where the side walls are extended and parallel, the front wall, the top portion, and the bottom portion defining a substantially triangular enclosure; and
the case having a carrying configuration, the top portion, the side portions, the front portion, the back portion, and the bottom portion defining an enclosure where the top portion is substantially parallel to the bottom portion, and the back portion is disposed parallel to the front portion and extending in the upward direction perpendicular to the bottom portion,
wherein a front wall latch extends from the front wall and is secured to the front portion when the case is in the enclosing configuration.

5. A case for holding an electronic device comprising:
a bottom portion and a top portion;
side portions disposed on opposing sides of the bottom portion, the side portions extending in an upward direction perpendicular to the bottom portion;
a front portion extending in the upward direction perpendicular to the bottom portion, the front portion disposed between the side portions;
a back portion joining the bottom portion and the top portion;
a front wall connected to the top portion;
opposing side walls connected to the top portion and a front wall in a collapsible manner;
the case having an enclosing configuration, the front wall, the top portion, the side walls, the side portions, the front portion, the back portion, and the bottom portion defining an enclosure where the side walls are extended and parallel, the front wall, the top portion, and the bottom portion defining a substantially triangular enclosure, wherein the side walls comprise a surface feature for helping maintain the enclosing configuration; and
the case having a carrying configuration, the top portion, the side portions, the front portion, the back portion, and the bottom portion defining an enclosure where the top portion is substantially parallel to the bottom portion, and the back portion is disposed parallel to the front portion and extending in the upward direction perpendicular to the bottom portion.

6. The case according to claim 1, the case having a loading configuration, the top portion, the back portion, and the bottom portion defining a plane so that the electronic device may be inserted without adjusting the side portions or the front portion.

7. A case for holding an electronic device comprising:
a bottom portion and a top portion;
side portions disposed on opposing sides of the bottom portion, the side portions extending in an upward direction perpendicular to the bottom portion;
a front portion extending in the upward direction perpendicular to the bottom portion, the front portion disposed between the side portions;
a back portion joining the bottom portion and the top portion;
a front wall connected to the top portion;
opposing side walls connected to the top portion and a front wall in a collapsible manner;

the case having an enclosing configuration, the front wall, the top portion, the side walls, the side portions, the front portion, the back portion, and the bottom portion defining an enclosure where the side walls are extended and parallel, the front wall, the top portion, and the bottom portion defining a substantially triangular enclosure;

the case having a carrying configuration, the top portion, the side portions, the front portion, the back portion, and the bottom portion defining an enclosure where the top portion is substantially parallel to the bottom portion, and the back portion is disposed parallel to the front portion and extending in the upward direction perpendicular to the bottom portion; and an aperture cover covering an opening formed in the top portion and the front wall, wherein the aperture cover may be moved to uncover the opening formed in the top portion and the front wall, when the case is in the enclosing configuration.

8. The case according to claim 3, wherein in the enclosing configuration the front wall and the top portion may be rotated about the enclosure without obstructing the opening formed in the top portion and the front wall.

9. A combination of portable computing device and case for holding the portable computing device, the case comprising:

a bottom portion and a top portion;

side portions disposed on opposing sides of the bottom portion, the side portions extending in an upward direction perpendicular to the bottom portion;

a front portion extending in the upward direction perpendicular to the bottom portion, the front portion disposed between the side portions;

a back portion joining the bottom portion and the top portion;

a front wall connected to the top portion;

opposing side walls connected to the top portion and the front wall in a collapsible manner;

the case having an enclosing configuration, the front wall, the top portion, the side walls, the side portions, the front portion, the back portion, and the bottom portion defining an enclosure where the side walls are extended and parallel, the front wall, the top portion, and the bottom portion defining a substantially triangular enclosure;

the case having a carrying configuration, the top portion, the side portions, the front portion, the back portion, and the bottom portion defining an enclosure where the top portion is substantially parallel to the bottom portion, and the back portion is disposed parallel to the front portion and extending in the upward direction perpendicular to the bottom portion; and the portable computing device comprising a digital camera, a processor and a memory, wherein the portable computing device is housed within the top portion, the side portions, the front portion and the back portion; and wherein the portable computing device displays both a current view of that is within the viewing range of the digital camera, as well as images of objects generated by the portable computing device to create an augmented reality.

10. The combination according to claim 9, wherein the case comprises a securing mechanism for securing the electronic device.

11. The combination according to claim 10, wherein the securing mechanism comprises a side portion securing portion formed on each side portion and a front portion securing portion formed on the front portion.

12. The combination according to claim 9, wherein a front wall latch extends from the front wall and is secured to the front portion when the case is in the enclosing configuration.

13. The combination according to claim 9, wherein the side walls comprise a surface feature for helping maintain the enclosing configuration.

14. The combination according to claim 9, the case having a loading configuration, the top portion, the back portion, and the bottom portion defining a plane so that the electronic device may be inserted without adjusting the side portions or the front portion.

15. The combination according to claim 9, the case further comprising an aperture cover covering an opening formed in the top portion and the front wall, wherein the aperture cover may be moved to uncover the opening formed in the top portion and the front wall, when the case is in the enclosing configuration.

16. The combination according to claim 9, wherein in the enclosing configuration the front wall and the top portion may be rotated about the enclosure without obstructing the opening formed in the top portion and the front wall.

17. The case according to claim 4, wherein in the enclosing configuration the front wall and the top portion may be rotated about the enclosure without obstructing the opening formed in the top portion and the front wall.

18. The case according to claim 5, wherein in the enclosing configuration the front wall and the top portion may be rotated about the enclosure without obstructing the opening formed in the top portion and the front wall.

19. The case according to claim 7, wherein in the enclosing configuration the front wall and the top portion may be rotated about the enclosure without obstructing the opening formed in the top portion and the front wall.

* * * * *